3,205,217
HYDROGENATION PROCESS
Jack Kwiatek and Irving L. Mador, Cincinnati, Ohio, assignors to National Distillers and Chemical Corporation, New York, N.Y., a corporation of Virginia
No Drawing. Filed Mar. 27, 1961, Ser. No. 98,305
3 Claims. (Cl. 260—143)

The present invention relates to a novel process for catalytic reductive hydrogenation of certain compounds with a catalyst comprising a metal ion of the cobalt group and cyanide anions and, more particularly, to reductive hydrogenation of certain compounds that are normally not reducible, or at least are difficultly reducible by such catalysts and may even function as poisons for said catalysts.

The present invention is based on the discovery that certain types of compounds, examples of which include nitro compounds, nitroso compounds, quinones, aromatic aldehydes and others, can be satisfactorily reduced by reaction thereof in presence of hydrogen with an aqueous solution containing cyanide anions and ions of a cobalt group metal (i.e., cobalt, rhodium and iridium) that is basic and that, preferably, has a pH of from about 7 to about 13, provided that the cobalt metal ion is maintained in excess of a mole to mole ratio with the substrate to be reduced. Thus, in generic aspect, the invention relates to reductive hydrogenation of functional groups in compounds which are normally not reduced or are difficult to reduce, by means of complex cyanides of the cobalt group but which have been found to be catalytically reducible when reacted with hydrogen in presence of the catalyst in excess of a mole to mole ratio with the substrate. Such functional groups include nitro groups, nitroso groups, aromatic aldehydes and quinone groupings.

As embodiments, the process can be carried out in batch-wise manner using such relative amounts of the substrate to catalyst or, in a manner whereby a relatively small amount of the substrate is reacted with the catalyst and, following reduction of all or a portion of the substrate, adding substrate in increments while at all times maintaining the amount of unreacted substrate in contact with the catalyst at substantially less than a mole to mole ratio with the catalyst. In preferred embodiments, the catalyst substrate ratio is maintained at from about 0.3–0.6 mole of the substrate per mole of the catalyst.

Although, as aforesaid, the process embodied herein relates generally to reductive hydrogenation of reducible compounds that normally are not reduced by means of complex cyanides of metals of the cobalt group, the following are examples of specific types of compounds suitable for practice of this invention: compounds containing a nitro group, such as in nitrobenzenes, to produce azoxy-, azo- and hydrazo-benzenes, azo-benzenes to produce hydrazobenzenes; azoxybenzenes to produce azobenzenes; aromatic compounds containing an aldehydic group, as benzaldehyde, to produce benzyl alcohol, quinones to produce hydroquinones, such as benzoquinone to produce hydroquinone; anthraquinone to produce anthrahydroquinone; N-nitrosodialkyl amines such as N-nitrosodimethylamine to produce unsymmetrical dimethylhydrazine, and the like.

For carrying out the reaction embodied herein, the cobalt group metal ions are provided in the reaction mixture by use of a water-soluble salt of such a metal. For that purpose, such salts of organic or inorganic acids may be used and, for example, salts such as cobalt nitrate, cobalt acetate, cobalt sulfate, cobalt carbonate, cobalt chloride, etc. Regarding the cyanide anions, they are provided in the reaction mixture preferably by use of water-soluble alkali metal cyanides, such as sodium cyanide, potassium cyanide, etc., and mixtures of cobalt cyanide with potassium cyanide and/or sodium cyanide.

Although the ratio of cyanide anions to cobalt metal group ions present in the reaction mixture may be varied, the invention is generally carried out using a ratio of from about two to ten cyanide anions per ion of the cobalt group metal and, more specifically, from about three to about six cyanide anions per ion of such a metal, such ratios being obtained by appropriate use of the required amounts of the substance or substances employed to provide the cyanide anions and cobalt group metal ions.

The process embodied herein is caried out with the stated metal ions and cyanide anions being in aqueous solution. In certain instances, it may be desirable to improve contact between the substrate and the stated metal ions and cyanide anions by dissolving the substrate in a suitable solvent. For such a purpose, substances such as dioxane, methanol, n-butanol, isopropanol, tetrahydrofuran, benzene, hexane, and the like may be employed and which are otherwise inert with respect to the reactants employed and the products of the reaction embodied herein.

The reaction embodied herein may be carried out under rather mild conditions of hydrogen pressure, such as at one atmosphere, and temperatures, such as room temperature. However if desired, higher hydrogen pressures can be used and, for example, elevated hydrogen pressures such as up to about 1000 p.s.i.; and, as to temperatures a preferred range is from about 0° C. to about 125° C., but still higher temperatures can be used if desired.

In order to further describe the invention, the following embodiments are set forth for purposes of illustration and not limitation. For purposes of comparison, and to illustrate the improvements provided by practice of this invention, designated in the following examples as "incremental addition," there is also set forth comparable examples (designated non-incremental addition) but carried out with use of at least a mole to mole ratio of the cobalt group metal catalyst to the substrate.

EXAMPLE 1

*Nitrobenzene (incremental addition)*

A solution of potassium cyanide (0.153 mole) in 100 ml. water was added to a solution of cobaltous chloride (0.03 mole) in 100 ml. water with stirring under a hydrogen atmosphere; the dark green potassium cobaltous cyanide complex originally formed absorbed 260 ml. hydrogen. Into this reduced solution was injected 1 ml. (.01 m.) nitrobenzene and an additional 401 ml. hydrogen was absorbed; another 1 ml. injection of nitrobenzene resulted in absorption of an additional 412 ml. hydrogen. At this point, an aqueous solution containing 0.02 m. KOH was injected with 1 ml. nitrobenzene with the absorption of an additional 651 ml. hydrogen; another 1 ml. injection resulted in an additional 444 ml. hydrogen absorption after injection of an additional 0.02 m. KOH. A total of 1908 ml. hydrogen was absorbed by the nitrobenzene (approx. $2H_2$/nitrobenzene).

The reaction mixture was extracted with ether, the extract was dried over magnesium sulfate and the ether was removed to yield a red oil. Crystallization from heptane-petroleum ether yielded 0.5 g. hydrazobenzene (M.P. 128–9° C. and confirmed by infrared spectrum); crystallization of the residue from dilute acetic acid yielded 1.0 g. azobenzene, M.P. 66–8° C.

EXAMPLE 2

*Nitrobenzene (non-incremental)*

A solution of potassium cyanide (0.15 mole) in 142 ml. water was added to a stirred suspension of nitrobenzene (10 ml.) in a solution of cobaltous chloride (0.03 mole) in 125 ml. water under a hydrogen atmosphere; only 38 ml. $H_2$ was absorbed.

EXAMPLE 3

1-chloro-2-nitrobenzene (incremental)

.05 mole of the above compound dissolved in 25 ml. benzene was reduced in a similar manner as shown in Example 1, except that 0.012 mole of aqueous KOH was added. A total of 1830 ml. hydrogen was absorbed.

The reaction mixture yielded 2,2'-dichloroazoxybenzene, M.P. 53–5° C.,
2,2'-dichloroazobenzene, M.P. 131–4° C., and
2,2-dichlorohydrazobenzene, M.P. 80–4° C.

EXAMPLE 4 p-Nitrotoluene (incremental)

A solution of potassium cyanide (0.153 m.) in 100 ml. water was added to a stirred solution of cobaltous chloride (0.03 m.) in 100 ml. water under a hydrogen atmosphere; 260 ml. hydrogen was absorbed. p-Nitrotoluene (.02 mole in 20 ml. benzene) was injected into the mixture in two equal increments; a total of an additional 770 ml. hydrogen was absorbed.

The reaction mixture yielded p-tolylhydroxylamine and p-azoxytoluene.

EXAMPLE 5

N-nitrosodimethylamine (incremental addition)

N-nitrosodimethylamine (0.04 mole) was added to a reduced system as described in Example 1 in three equal increments; a total of 1618 ml. additional hydrogen was absorbed.

The reaction mixture was distilled to collect 100 ml. of aqueous distillate. This was made acidic with concentrated hydrochloric acid and the water was then removed by evaporation in a vacuum. The white salt residue was extracted with hot alcohol, the extract was concentrated and treated with ether. The white precipitate was collected on a filter, had a melting point of 95–140° C., and comprised a mixture of dimethylamine hydrochloride (M.P. 170° C.) and unsymmetrical dimethylhydrazine hydrochloride (M.P. 82° C.). The presence of dimethylhydrazine was shown by its reducing action on cold Fehlings solution.

EXAMPLE 6

Benzaldehyde (incremental addition)

Benzaldehyde (0.05 mole) was added to a reduced system as described in Example 1 in six equal increments, followed by the addition of .06 mole of aqueous KOH; a total of an additional 740 ml. hydrogen was absorbed.

The reaction mixture was extracted with ether, and the residue, after removal of the ether was distilled to yield 4.11 g. benzyl alcohol; the α-naphthyl urethane derivative gave a M.P. of 134–5° C. (literature value 134° C.).

EXAMPLE 7

Benzaldehyde (non-incremental)

Benzaldehyde (10 ml.) was used in an attempted reduction as in Example 2; only 266 ml. hydrogen was absorbed, presumably by the cobaltous cyanide complex itself.

EXAMPLE 8

Benzoquinone (incremental addition)

A solution of potassium cyanide (.153 mole) in 100 ml. water was added to a solution of cobaltous chloride (.03 mole) in 100 ml. water. 0.1 mole of KOH pellets were then added with stirring under an atmosphere of hydrogen. A solution of benzoquinone (0.1 mole) in 100 ml. benzene was added in 20 equal increments; a total of an additional 2024 ml. hydrogen gas was absorbed.

The reaction mixture was acidified, extracted with ether, the extract was dried and the ether was removed by evaporation to yield a brown oil; upon crystallization from benzene-heptane, hydroquinone (M.P. of 173–4° C.) was obtained and its presence confirmed by infrared analysis.

EXAMPLE 9

Benzoquinone (non-incremental)

A solution of potassium cyanide (0.153 mole) in 100 ml. water was added to a solution of cobaltous chloride (.03 mole) in 125 ml. water under a hydrogen atmosphere with stirring; 275 ml. hydrogen was absorbed. Benzoquinone (0.1 mole) dissolved in dioxane was injected; no hydrogen absorption was observed.

EXAMPLE 10

Anthraquinone (incremental addition)

A solution of .05 mole anthraquinone in 100 ml. benzene was added in ten equal increments to a prereduced potassium cobaltous cyanide complex solution under an atmosphere of hydrogen; a total of 113 ml. hydrogen was absorbed.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A reductive hydrogenation process which comprises reacting an aromatic nitro compound selected from the group consisting of nitrobenzene, 1-chloro-2-nitrobenzene and p-nitrotoluene with hydrogen at a pressure up to about 1000 p.s.i. in an aqueous basic solution at a pH from about 7 to about 13 containing divalent cobalt ions and cyanide ions, the molar quantity of cobalt ion being in excess of said aromatic nitro compound, with from about two to about ten cyanide ions per cobalt ion at a temperature from about 0° to 125° C., to obtain the corresponding hydroxylamino, azo, hydrazo, and azoxy reaction products.

2. The reductive hydrogenation process of claim 1 wherein said aromatic nitro compound is nitrobenzene.

3. A reductive hydrogenation process which comprises reacting N-nitrosodimethylamine with hydrogen at a pressure up to about 1000 p.s.i., in an aqueous basic solution at a pH from about 7 to about 13 containing divalent cobalt ions and cyanide ions, the molar quantity of cobalt ion being in excess of said N-nitrosodimethylamine, with from about two to about ten cyanide ions per cobalt ion at a temperature from about 0° to about 125° C., to obtain the corresponding hydrazine reaction product.

References Cited by the Examiner

UNITED STATES PATENTS 3,009,969   11/61   Spencer et al. _____ 252—438

OTHER REFERENCES

Halpern, J.: Journal of Physical Chemistry, vol. 63 (1959), pages 398–403.

Iguchi, M.: Chemical Soc. Japan, vol. 63, pages 634–643 (1942).

King et al.: J. Am. Chem. Soc., vol. 80 (1958), pages 2060–2065.

Mills et al.: Journal of Physical Chemistry, vol. 63 (1959), pages 403–410.

Winfield: Revs. Pure Appl. Chem. (Australia), vol. 5 (1955), pages 217–245.

CHARLES B. PARKER, *Primary Examiner.*

JOSEPH P. BRUST, *Examiner.*